Figure 1:
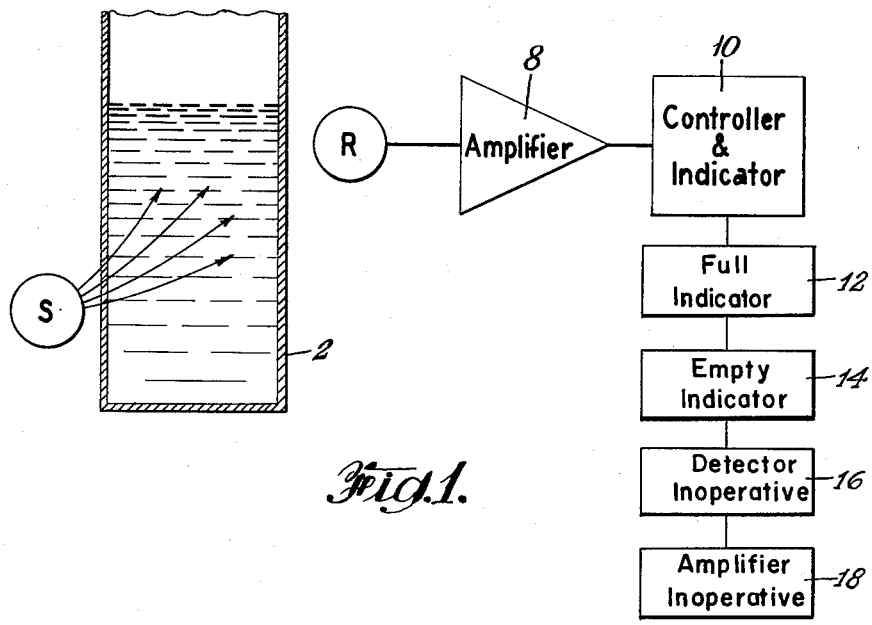

INVENTOR.
LOUIS J. ROGERS

May 12, 1964 L. J. ROGERS 3,133,192
FAIL-SAFE RADIOACTIVE ABSORPTION APPARATUS
FOR LIQUID LEVEL DETERMINATION
Filed Dec. 28, 1959 2 Sheets-Sheet 2

INVENTOR.
LOUIS J. ROGERS
BY
*Maurice W. Ryan*
ATTORNEY

United States Patent Office 3,133,192
Patented May 12, 1964

3,133,192
FAIL-SAFE RADIOACTIVE ABSORPTION APPARATUS FOR LIQUID LEVEL DETERMINATION
Louis J. Rogers, Nitro, W. Va., assignor to Union Carbide Corporation, a corporation of New York
Filed Dec. 28, 1959, Ser. No. 862,165
7 Claims. (Cl. 250—43.5)

This invention relates to a novel radiation-absorption level indicating apparatus. More particularly, it relates to such an apparatus having a fail-safe feature for additionally indicating equipment failure.

It is desirable in industrial processes to know and to automatically control the volume of bulk material in storage bins. This knowledge is extremely important if such material is used in a given process wherein either extreme danger to operating personnel or waste is the result of such material going below a given critical level. For optimum operating efficiencies it is also necessary to relay or telemeter this information to remote control locations.

A number of devices have been developed which perform the above level sensing control and telemetering functions. The subject matter of the instant invention is concerned with one such device known as a radiation-absorption level indicating instrument.

In such instruments a radiation source, usually sub-atomic in nature, is placed on one side of a container or bin and a radiation detector or receiver such as a Geiger-Müller (G.M.) tube is located on the opposite side of the container. As a radiation absorptive material fills the space in the bin between the source and the detector there is a decrease in the amount of radiation received by the detector which is reflected by a decrease in the signal output thereof. In some devices where it is desired to obtain readings calibrated to indicate the instantaneous material level between an upper and lower limit, it is possible to place the source in one position and the receiver in another so that the output of the receiver will vary depending upon the amount or level of material interposed between the two points.

Alternatively, the radiation source and receiver may be placed in the same plane in which case the receiver will simply indicate the presence or absence of material between the two points. When either of these arrangements is used as a minimum material level indicator, with the usual amplifying and metering arrangements for receiving the G.M. tube signal, a maximum signal will indicate that no absorptive material is between the source and receiver and will thus indicate a below minimum level or dangerous condition. Conversely, when all the space between the radiation source and receiver is filled with absorptive material a minimum signal will be developed indicating a full or safe condition, and draining valves may be automatically actuated to lower the level.

However, with such minimum signal-safe or null-safe indicators, an equipment failure such as an amplifier or G.M. tube failure will result in a full or safe indication due to the absence of a signal, and the automatic equipment would continue to drain the vessel unaware of the failure.

It is accordingly an object of this invention to provide a radiation-absorption level indicator operating on the null-safe principle which will indicate both a minimum-signal level and also an equipment failure.

It is a further object to provide such an apparatus for indicating an equipment failure by sensing a signal difference between maximum absorption and theoretical total absorption of the radiation source.

Figure 2:
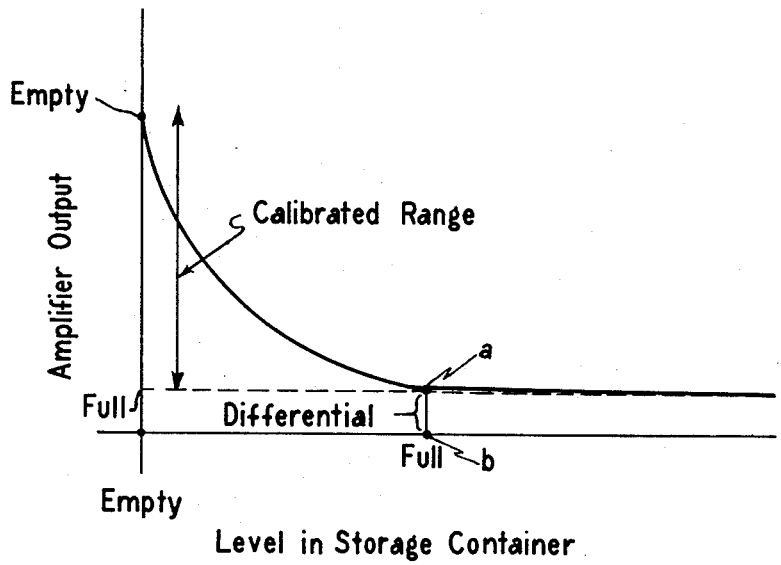
Figure 3:
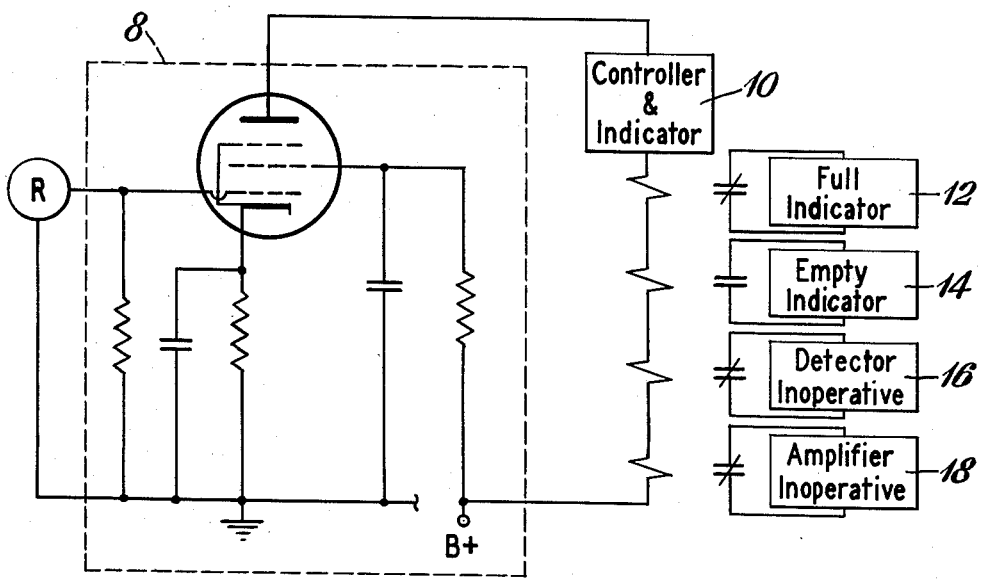

Other objects and advantages will be apparent from the description and drawings in which:

FIG. 1 is a block diagram of an apparatus embodying the present invention and,
FIG. 2 is a graph representing the amplifier output versus material level within the container of FIG. 1.
FIG. 3 is a partial schematic diagram of apparatus according to the present invention.

The objects of this invention are accomplished in general by a radiation-absorption level indicating device for use with a storage container for bulk material. A radiation source is placed on one side of the container and a radiation sensitive detector is located on the opposite side of the container. An amplifier is connected to the output of said detector, and produces a maximum signal when there is no bulk material between the source and the detector and a minimum but measurable signal when the container is full. First and second indicators are connected to the output of said amplifier responsive respectively to the maximum signal and to a signal less than the minimum or "full" signal from the amplifier.

With such a device an operator will be warned that the level in the storage container has reached an empty or dangerously low level by energization of the first indicator when the amplifier emits a maximum signal due to an absence of absorptive material between the radiation source and the detector. Energization of the second indicator will indicate an equipment failure in the level indicating apparatus due to the failure of the amplifier and/or detector to emit the predetermined minimum or "full" signal.

The invention will now be described with reference to the drawings particularly FIGS. 1 and 3. The numeral 2 indicates a container for absorptive bulk material which may be in liquid, powdered or lump form. A source of sub-atomic radiation S such as radium or certain radioactive isotopes such as cesium-137, cobalt-60, etc. is placed on one side of the container and a radiation detector R such as a G.M. (Geiger-Müller) tube is located on the opposite side of the container preferably in a different vertical plane from the source. Thus, as absorptive material is fed into the container and fills the path between the source S and detector R, the amount of radiation reaching the detector will go from a maximum when no material is between S and R to a minimum when all of the space is filled and the ionization and output of the G.M. tube detector will go from a maximum to a minimum. The output from the detector is then fed to an amplifier 8 which produces a signal directly proportional to that received from the detector.

The output from the amplifier is in turn fed to an apparatus 10 for utilizing the information therefrom. In this instance the apparatus 10 is indicated as a controller and indicator whose operations are separate functions. The controller would normally operate on full and empty signals from the amplifier and would control material feed to the container in accordance therewith. Many different types of controllers could be used for this purpose any of which would work equally well with the instant invention but which have no direct bearing thereon. The indicator of apparatus 10 may be a galvanometer type meter-relay having a scale calibrated in terms of the capacity of the container 2 and appropriate relay contacts for "full," "empty," etc. auxiliary indication activated by a meter indicating arm or needle.

Other indicators utilized with the present invention would preferably comprise two or more current or voltage sensitive devices such as relay controlled lights or buzzers 12, 14, 16, 18 which would operate respectively on "full," "empty" or one or another of "equipment inoperative" signals from the amplifier. These devices can be chosen from the many well-known actuating media such as sensitive relays, electronic relays, cold cathode triggered relays and the like.

The operation of the instant invention is shown graphically in FIG. 2 wherein the amplifier output is plotted against material level in the container. When the container is empty the amplifier produces a maximum output signal which will effect an "empty" reading on the meter indicator and energize the relay means associated with the "empty" indicator 14. When full the amplifier produces a minimum signal having a magnitude indicated by the differential distance (a) (b) on the graph, which minimum signal will effect a "full" reading on the meter indicator and cause the relay contacts associated with "full" indicator 12 to fall closed, producing a desired alarm or "full" indication. As long as the equipment is operating properly and the container is full the amplifier will always produce this minimum signal increasing to a maximum signal as the container empties. This minimum signal can also be used to actuate emptying means through the controller if so desired. As noted above, the controller and indicator apparatus 10 may comprise a suitable meter calibrated to indicate intermediate container material levels when the source S and detector R are located in vertically displaced planes as shown in FIG. 1.

The only factor capable of causing the amplifier output to fall below the level indicated at (a) would be failure of the amplifier and/or the source-detector system depending upon the biasing of the amplifier.

Since it may be assumed that some radiation will reach the detector even when the container is full of absorptive material, according to one embodiment of the invention, the detector is adjusted to have a slight output at the full material level and the amplifier is biased to cutoff with no signal input from the detector. The minimum signal developed by the amplifier then corresponds to the minimum or "full" signal (a). It may readily be seen that if either the detector, source or amplifier became inoperative the amplifier output would drop to zero. An open-when-energized relay in a warning light or buzzer circuit such as 18 would be de-energized in a preferred embodiment of the invention which would in turn warn an operator of the inoperative condition in the level indicating apparatus.

In a further embodiment, the amplifier is biased to a point between (a) and (b) without the minimum signal from the detector whereby the signal (a) will be developed only when the detector and amplifier are both operative. Failure of the detector then causes the output signal to drop to said point between (a) and (b), effecting a closure of the relay contacts associated with the "detector inoperative" indicator 16, while failure of the amplifier itself causes complete disappearance of any output signal, effecting a closure of the relay contacts associated with the "amplifier inoperative" indicator 18. Preferably a warning circuit including a relay is used to show any drop below point (a) but a meter also connected to the output of the amplifier as set forth above would show whether output had dropped to zero or to said intermediate point. Thus the operator could tell immediately which portion of the apparatus was defective.

In a still further embodiment, where it is not possible to use a sufficiently powerful radiation source to cause ionization in the detector when the container is full, failsafe protection against amplifier failure is provided by biasing the amplifier to produce the signal (a) with no input signal from the detector. Obviously this embodiment will not warn of detector failures but only of an amplifier failure since failure of the detector would have no effect on the minimum or full signal from the amplifier.

It may thus be seen that the apparatus of the instant invention gives not only a warning signal for a dangerously low or full material level but also gives a different warning signal for equipment failure. Other equipment currently available gives only a single warning signal for either contingency and this only after the detector signal has been reversed 180° in phase wherein a maximum detector ionization and output results in a minimum amplifier signal.

The invention thus greatly increases the utility of such level indicators by giving greater flexibility and dependability to their functions.

While certain preferred embodiments of the invention have been shown and described for purposes of illustration, it is to be understood that certain modifications could be made by a person skilled in the art without departing from the spirit and scope of the invention.

What is claimed is:

1. A radiation-absorption level indicator which comprises in combination with a container for storing radiation absorptive bulk material, a source of radiation located on one side of said container, a detector for said radiation on the other side of said container, an amplifier connected to said detector for developing an output signal directly proportional to the amount of radiation received by said detector; said amplifier developing a maximum signal when there is no material between the radiation source and the detector and a predetermined minimum signal when the space therebetween is completely full of the absorptive material, and means for indicating the amplifier output, said last named means comprising a first indicator operative in response to said maximum signal and a second indicator operative in response to a signal less than the predetermined minimum signal developed by the amplifier.

2. A radiation-absorption level indicating apparatus for use with a bulk material storage container which comprises a radiation source on one side of said container, a radiation detector on the opposite side of the container from said source for developing a signal proportional to the amount of radiation received, an amplifier connected to the output of the detector for developing an output signal directly proportional to that from the detector, said amplifier producing a maximum signal when the container is empty and a predetermined minimum signal when the container is full and the apparatus is operative and means for distinguishably indicating when a maximum signal is being developed by said amplifier and when the signal from said amplifier is less than said predetermined minimum signal.

3. An apparatus as set forth in claim 2 wherein the predetermined minimum signal from said amplifier is produced entirely by a fixed bias on the amplifier input.

4. An apparatus as set forth in claim 2 wherein the amplifier is biased to cutoff and the predetermined minimum signal from the amplifier is produced by a predetermined minimum signal output from the detector when the container is full of bulk material.

5. An apparatus as set forth in claim 2 wherein the radiation source and detector are vertically displaced with respect to each other and wherein the indicating means includes an output meter and a first means for giving a warning signal when the amplifier output reaches a maximum and a second means for giving a warning signal when the amplifier output falls below said predetermined minimum output signal and wherein the predetermined minimum signal is produced in part by a fixed bias at the amplifier input and in part by a minimum signal from the detector when the container is full whereby an operator will be able to determine whether the detector or the amplifier is defective in the event of an apparatus failure.

6. An apparatus as set forth in claim 2 wherein a first normally open relay is connected to the output of the amplifier which is operable on the occurrence of the maximum signal to supply power to a first alarm means and a second normally closed relay also connected to the output of the amplifier for actuating a second alarm means when the output of the amplifier falls below the predetermined minimum value.

7. An apparatus as set forth in claim 5 wherein a first normally open relay is connected to the output of the amplifier to energize the first means when the amplifier produces said maximum signal and a second normally closed relay also connected to the output of the amplifier to energize the second means when the amplifier output falls below said predetermined minimum value.

References Cited in the file of this patent
UNITED STATES PATENTS

| | | |
|---|---|---|
| 2,456,233 | Wolf | Dec. 14, 1948 |
| 2,565,963 | Graham | Aug. 28, 1951 |
| 2,646,556 | Allen | July 21, 1953 |
| 2,674,695 | Grace | Apr. 6, 1954 |
| 2,708,721 | Ziffer | May 17, 1955 |
| 2,713,124 | Graham | July 12, 1955 |
| 2,715,720 | Jenkins | Aug. 16, 1955 |
| 2,963,588 | Wilson | Dec. 6, 1960 |